(12) United States Patent
Shitano et al.

(10) Patent No.: US 7,583,686 B2
(45) Date of Patent: Sep. 1, 2009

(54) NOTIFICATION METHOD, CONNECTION APPARATUS, COMMUNICATION METHOD, AND PROGRAM

(75) Inventors: Masaki Shitano, Yokohama (JP); Kenichi Fujii, Yokohama (JP); Takashi Hirata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 428 days.

(21) Appl. No.: 11/539,108

(22) Filed: Oct. 5, 2006

(65) Prior Publication Data

US 2007/0115996 A1 May 24, 2007

Related U.S. Application Data

(63) Continuation of application No. PCT/JP2005/006885, filed on Apr. 7, 2005.

(30) Foreign Application Priority Data

Apr. 22, 2004 (JP) .............................. 2004-126845

(51) Int. Cl.
*H04L 12/28* (2006.01)
(52) U.S. Cl. .................... 370/401; 709/218; 709/249
(58) Field of Classification Search ............. None
See application file for complete search history.

(56) References Cited

U.S. PATENT DOCUMENTS

| 6,473,098 | B1 | 10/2002 | Wakai et al. |
| 6,523,696 | B1 | 2/2003 | Saito et al. |
| 6,587,861 | B2 | 7/2003 | Wakai et al. |
| 6,633,871 | B1 | 10/2003 | Jeyachandran et al. |
| 7,218,643 | B1 | 5/2007 | Saito et al. |
| 2002/0147791 | A1* | 10/2002 | Choi .......................... 709/217 |
| 2003/0030663 | A1 | 2/2003 | Wakai et al. |
| 2003/0063608 | A1 | 4/2003 | Moonen |
| 2003/0236897 | A1 | 12/2003 | Shitano et al. |
| 2004/0201866 | A1 | 10/2004 | Maekawa et al. |
| 2004/0233904 | A1 | 11/2004 | Saint-Hilaire |
| 2005/0053016 | A1 | 3/2005 | Kawai et al. |
| 2007/0032888 | A1 | 2/2007 | Hirata et al. |
| 2007/0038695 | A1 | 2/2007 | Hirata |

FOREIGN PATENT DOCUMENTS

| CN | 1551574 | 12/2004 |
| JP | 11-187061 | 7/1999 |

(Continued)

OTHER PUBLICATIONS

Japanese Office Action dated Jan. 29, 2008 issued during prosecution of related Japanese application No. 2004-126845.

(Continued)

*Primary Examiner*—Bob A Phunkulh
(74) *Attorney, Agent, or Firm*—Fitzpatrick, Cella, Harper & Scinto

(57) ABSTRACT

A UPnP device proxy apparatus (103) recognizes a device connected to a network (120) and transmits information regarding the recognized device to UPnP device proxy apparatus (101) The UPnP device proxy apparatus (101) receives the information transmitted from the UPnP device proxy apparatus (103) and transmits, based on the received information, a message indicating that the recognized device is available onto a network 105.

2 Claims, 21 Drawing Sheets

FOREIGN PATENT DOCUMENTS

| | | |
|---|---|---|
| JP | 2000-174797 | 6/2000 |
| JP | 2002-288054 | 10/2002 |
| JP | 2002-353968 | 12/2002 |
| JP | 2003-208366 | 7/2003 |
| JP | 2004-5170 | 1/2004 |
| JP | 2004-5533 | 1/2004 |
| JP | 2004-21481 | 1/2004 |
| WO | 03/030452 | 10/2003 |
| WO | 2004/105344 | 12/2004 |

OTHER PUBLICATIONS

Chinese Office Action dated Mar. 7, 2008 issued during prosecution of related Chinese application No. 200580012456.9.

M. Rodriguez-Martinez, et al., Registration and Discovery of Services in the NetTraveler Integration System for Mobile Devices, Information Technology: Coding And Computing, 2004, Proceedings. ITCC 2004. International Conference Las Vegas, NV, Apr. 5-7, 2004, pp. 275-281.

European Search Report dated Aug. 19, 2008 issued during prosecution of related European application No. 05728701.3.

* cited by examiner

COMPUTER BLOCK DIAGRAM

FIG. 5

| UDN | DescURL | Life Time | Latest Time |
|---|---|---|---|
| uuid:hogeprinter000 | http://192.168.0.2/desc.xml | 30 | 23:22:10:11 |
| uuid:hogeprinter001 | http://192.168.0.22/desc.xml | 60 | 23:22:10:12 |
| uuid:hogedicame000 | http://192.168.0.44/desc.xml | 60 | 23:22:10:30 |
| uuid:hogedvc000 | http://192.168.0.10/desc.xml | 30 | 23:22:10:12 |
| uuid:hogedvc011 | http://192.168.0.77/desc.xml | 30 | 23:22:10:14 |
| uuid:hogescanner000 | http://192.168.0.23/desc.xml | 30 | 23:22:10:60 |

FIG. 9

```
<?xml version='1.0' ?>
<SOAP-ENV:Envelope xmlns:SOAP-ENV="http://schemas.xmlsoap.org/soap/envelope/"
 xmlns:xsi="http://www.w3.org/1999/XMLSchema-instance" xmlns:xsd="http://www.w3.org/1999/XMLSchema">
  <SOAP-ENV:Body>
    <ns1:connect xmlns:ns1="urn:userinfoservice" SOAP-ENV:encodingStyle="http://schemas.xmlsoap.org/soap/encoding/">
      <num1 xsi:type="xsd:string">www.xxx.upnproxy101</num1>
    </ns1:connect>
  </SOAP-ENV:Body>
</SOAP-ENV:Envelope>
```

FIG. 10

```
<?xml version='1.0' ?>
<SOAP-ENV:Envelope xmlns:SOAP-ENV="http://schemas.xmlsoap.org/soap/envelope/"
xmlns:xsi="http://www.w3.org/1999/XMLSchema-instance" xmlns:xsd="http://www.w3.org/1999/XMLSchema">
    <SOAP-ENV:Body>
        <ns1:connectResponse xmlns:ns1="urn:userinfoservice" SOAP-ENV:encodingStyle="http://schemas.xmlsoap.org/soap/encoding/">
            <return xsi:type="xsd:string">www.xxx.upnproxy201</return>
        </ns1:connectResponse >
    </SOAP-ENV:Body>
</SOAP-ENV:Envelope>
```

FIG. 11

```
<?xml version='1.0' ?>
<SOAP-ENV:Envelope xmlns:SOAP-ENV="http://schemas.xmlsoap.org/soap/envelope/"
xmlns:xsi="http://www.w3.org/1999/
XMLSchema-instance" xmlns:xsd="http://www.w3.org/1999/XMLSchema">
    <SOAP-ENV:Body>
        <ns1:byebye xmlns:ns1="urn:userinfoservice" SOAP-ENV:encodingStyle="http://schemas.xmlsoap.org/soap/encoding/">
            <num0 xsi:type="xsd:string">www.xxx.upnproxy201</num0>
            <num1 xsi:type="xsd:string">uuid:hogeprinter000</num1>
        </ns1:byebye >
    </SOAP-ENV:Body>
</SOAP-ENV:Envelope>
```

FIG. 12

```
<?xml version='1.0' ?>
<SOAP-ENV:Envelope xmlns:SOAP-ENV="http://schemas.xmlsoap.org/soap/envelope/" xmlns:xsi="http://www.w3.org/
1999/XMLSchema-instance" xmlns:xsd="http://www.w3.org/1999/XMLSchema">
  <SOAP-ENV:Body>
    <ns1:remoteAlive xmlns:ns1="urn:userinfoservice" SOAP-ENV:encodingStyle="http://schemas.xmlsoap.org/soap/encoding/">
      <num0 xsi:type="xsd:string">www.xxx.upnproxy201</num0>
      <num1 xsi:type="xsd:string">uuid:hogeprinter001</num1>
    </ns1:remoteAlive>
  </SOAP-ENV:Body>
</SOAP-ENV:Envelope>

--MIME_boundary
Content-Type: text/xml

<?xml version="1.0" ?>
- <root xmlns="urn:schemas-upnp-org:device-1-0">
- <specVersion>
  <major>1</major>
  <minor>0</minor>
  </specVersion>
  <URLBase>http://192.168.1.21:8081</URLBase>
  <device>
    <deviceType>urn:schemas-upnp-org:device:PrinterDevice:1</deviceType>
    <friendlyName>GCS</friendlyName>
    <manufacturer>Canon Inc.</manufacturer>
    <modelDescription>A Test Device for pinter</modelDescription>
    <modelName>LBP Printer</modelName>
    <modelNumber>XYZ1234</modelNumber>
    <serialNumber>1234567890</serialNumber>
    <UDN>uuid:hogePrinter000</UDN>
    <UPC>123456789012</UPC>
    <iconList>
    <icon>
    <mimetype>image/gif</mimetype>
    <width>30</width>
    <height>30</height>
    <depth>8</depth>
    <url>/icon.gif</url>
    </icon>
    </iconList>
    <serviceList>
    <service>
    <serviceType>urn:schemas-upnp-org:service:printerService:1</serviceType>
    <serviceId>urn:upnp-org:serviceId:printerService:1</serviceId>
    <SCPDURL>/TestService.xml</SCPDURL>
    <controlURL>/control</controlURL>
    <eventSubURL>/eventSub</eventSubURL>
    </service>
    </serviceList>
    <presentationURL>http://192.168.1.10:8080/presentation.html</presentationURL>
  </device>
</root>
--MIME_boundary--
```

FIG. 13

```xml
<?xml version="1.0" ?>
<root xmlns="urn:schemas-upnp-org:device-1-0">
        <specVersion>
                <major>1</major>
                <minor>0</minor>
        </specVersion>
        <URLBase>http://192.168.1.21:8081/vertualDevice</URLBase>
        <device>
                <deviceType>urn:schemas-upnp-org:device:printer:1</deviceType>
                <friendlyName>www.xxx.upnproxy201.printer</friendlyName>
                <manufacturer>hoge</manufacturer>
                <manufacturerURL>/manufacturer.html</manufacturerURL>
                <modelDescription>A Test Device for the UPnP</modelDescription>
                <modelName>Vanilla</modelName>
                <modelNumber>1.0</modelNumber>
                <modelURL>/model.html</modelURL>
                <serialNumber>1234567890</serialNumber>
                <UDN>uuid:hogePrinter000</UDN>
                <UPC>123456789012</UPC>
                <iconList>
                        <icon>
                                <mimetype>image/gif</mimetype>
                                <width>30</width>
                                <height>30</height>
                                <depth>8</depth>
                                <url>icon.gif</url>
                        </icon>
                </iconList>
                <serviceList>
                        <service>
                                <serviceType>urn:schemas-upnp-org:service:printbasic:1</serviceType>
                                <serviceId>urn:schemas-upnp-org:serviceId:printbasic:1</serviceId>
                                <SCPDURL>/service/service.xml</SCPDURL>
                                <controlURL>/control</controlURL>
                                <eventSubURL>/event</eventSubURL>
                        </service>
                </serviceList>
                <presentationURL>/presentation.html</presentationURL>
        </device>
</root>
```

FIG. 14

```
<?xml version='1.0' ?>
<SOAP-ENV:Envelope xmlns:SOAP
-ENV="http://schemas.xmlsoap.org/soap/envelope/" xmlns:xsi="http://www.w3.org/1999/XMLSchema-
instance" xmlns:xsd="http://www.w3.org/1999/XMLSchema">
    <SOAP-ENV:Body>
        <ns1:control xmlns:ns1="urn:userinfoservice" SOAP-
ENV:encodingStyle="http://schemas.xmlsoap.org/soap/encoding/">
            <num0 xsi:type="xsd:string">http://192.168.2.200/control</num0>
        </ns1:control >
    </SOAP-ENV:Body>
</SOAP-ENV:Envelope>

--MIME_boundary
Content-Type: text/xml

<?xml version="1.0" ?>
<s:Envelope
xmlns:s="http://schemas.xmlsoap.org/soap/envelope/"
s:encodingStyle="http://schemas.xmlsoap.org/soap/encoding/">
    <s:Body>
        <u:CreateJob xmlns:u="urn:schemas-upnp-org:service:printer:1">
        </u:CreateJob>
    </s:Body>
</s:Envelope>
--MIME_boundary--
```

FIG. 15

```
<?xml version='1.0' ?>
<SOAP-ENV:Envelope xmlns:SOAP-ENV="http://schemas.xmlsoap.org/soap/envelope/" xmlns:xsi="http://www.w3.org/1999/XMLSchema-instance" xmlns:xsd="http://www.w3.org/1999/XMLSchema">
    <SOAP-ENV:Body>
        <ns1:eventSub xmlns:ns1="urn:userinfoservice" SOAP-ENV:encodingStyle="http://schemas.xmlsoap.org/soap/encoding/">
            <num0 xsi:type="xsd:string">uuid:hogeprinter001k</num0>
            <num1 xsi:type="xsd:string">http://192.168.2.200/control</num1>
        </ns1:eventSub >
    </SOAP-ENV:Body>
</SOAP-ENV:Envelope>
```

FIG. 16

```
<?xml version='1.0' ?>
<SOAP-ENV:Envelope xmlns:SOAP-ENV="http://schemas.xmlsoap.org/soap/envelope/" xmlns:xsi="http://www.w3.org/1999/XMLSchema-instance" xmlns:xsd="http://www.w3.org/1999/XMLSchema">
    <SOAP-ENV:Body>
        <ns1:event xmlns:ns1="urn:userinfoservice" SOAP-ENV:encodingStyle="http://schemas.xmlsoap.org/soap/encoding/">
            <num0 xsi:type="xsd:string">uuid:hogeprinter001k</num0>
        </ns1:event >
    </SOAP-ENV:Body>
</SOAP-ENV:Envelope>

--MIME_boundary
Content-Type: text/xml

<?xml version="1.0" ?>
<e:propertyset xmlns:e="urn:schemas-upnp-org:event-1-0">
    <e:property>
        <variableName>10</variableName>
    </e:property>
</e:propertyset>
--MIME_boundary
```

FIG. 19

| HostName | IpAddress | Place | Comment |
|---|---|---|---|
| www.hoge.co.jp.proxy1 | 172.68.1.22 | TOKYO OFFICE | xxxxxx |
| proxy122 | 172.68.2.26 | oosaka | jkjljkjljkjkl |
| www.hoge2.co.jp.proxy1 | 172.68.11.2 | NY office | dsdfs |
| www.hoge22.co.jp.proxy1 | 172.68.12.34 | unknown | |
| proxy111 | 172.68.21.101 | Losangels | sdfsdfsdfsf |
| proxy103 | 172.68.33.2 | Tokyo no2 | yyyyy |

FIG. 20

BROWSER

URL: http://192.168.1.11/presentation.html  [OK]

PROXY REGISTRATION

PLACE:

COMMENT:

[REGISTRATION]

CONNECTION DESTINATION LIST:

- proxy101
- www.hoge.proxy111
- www.hogege.proxy2

PLACE: TOKYO OFFICE 1

COMMENT: PRINTER IS AVAILABLE IN TOKYO OFFICE 1

[CONNECTION]

FIG. 21

```
<?xml version='1.0' ?>
<SOAP-ENV:Envelope xmlns:SOAP-ENV="http://schemas.xmlsoap.org/soap/envelope/" xmlns:xsi="http://www.w3.org/1999/XMLSchema-instance" xmlns:xsd="http://www.w3.org/1999/XMLSchema">
    <SOAP-ENV:Body>
        <ns1:registration xmlns:ns1="urn:userinfoservice" SOAP-ENV:encodingStyle="http://schemas.xmlsoap.org/soap/encoding/">
            <num0 xsi:type="xsd:string">uuid:hogeprinter001</num0>
            <num1 xsi:type="xsd:string">192.168.2.200</num1>
            <num2 xsi:type="xsd:string">tokyo office1</num2>
            <num3 xsi:type="xsd:string">comment commect xxxx</num3>
        </ns1:registration>
    </SOAP-ENV:Body>
</SOAP-ENV:Envelope>
```

NOTIFICATION METHOD, CONNECTION APPARATUS, COMMUNICATION METHOD, AND PROGRAM

TECHNICAL FIELD

The present invention relates to a notification method, a connection apparatus, a communication method in the connection apparatus, and a program.

BACKGROUND ART

In recent years, along with the prevalence of networks, not only personal computers but also various devices such as mobile phones, electronic devices, and the like can be connected to networks. Environments used by mutually linking electronic devices and the like extend not only to office use but also home use since home electric appliances and other electric appliances which are solely used so far are connected to networks.

Easy connections and easy settings of various devices to be connected to networks are required above all.

As one of network techniques that can meet such requirements, a technique called Universal Plug and Play (to be abbreviated as UPnP hereinafter) is available. The UPnP is characterized in that it can apply a plug and play function to devices connected to the network, no driver software or the like need be installed, and it does not depend on the types of OSs (operating systems) running on devices.

Using the UPnP, the device can automatically do all of functions: to enter a network and dynamically acquire an IP address, to notify the self functions, to acquire the presence and functions of another device, and so forth, and to allow true zero network settings. Furthermore, the devices can directly communicate with each other, and form a peer-to-peer network.

The detailed specification of the UPnP is described in Universal Plug and Play Device Architecture Version 1.0.

However, with the above prior art, the UPnP or the like which can dynamically acquire an IP address and can notify the self functions cannot discover and control, e.g., device across the Internet, i.e., it cannot use a device which does not belong to the same subnet.

DISCLOSURE OF INVENTION

Problems that the Invention is to Solve

The present invention has been made to solve the aforementioned problems, and has as its object to notify an apparatus, which is connected to a third network and is connected via a first network and a second network, that a device connected to the first network is available.

The present invention has been made to solve the aforementioned problems, and has as its object to allow an apparatus, which is connected to a third network and is connected via a first network and a second network, to transmit a message using destination information valid in the third network to a device connected to the first network.

Means of Solving the Problems

In order to achieve the above object, the first invention according to the present application is directed to a notification method, wherein a first connection apparatus is connected to a first network and a second network, and a second connection apparatus is connected to the second network and a third network, for notifying an apparatus connected to the third network of information regarding a device connected to the first network, the method comprising the first connection apparatus recognizing the device connected to the first network, and transmitting information regarding the recognized device to the second connection apparatus via the second network, and the second connection apparatus receiving the information transmitted from the first connection apparatus, and transmitting, based on the received information, a message indicating that the recognized device is available onto the third network.

In order to achieve the above object, the first invention according to the present application is directed to a notification method, wherein a first connection apparatus is connected to a first network and a second network, and a second connection apparatus is connected to the second network and a third network, for notifying a apparatus connected to the third network of destination information of a message to a device connected to the first network, the method comprising the first connection apparatus acquiring first destination information of a message to the device connected to the first network, and transmitting the acquired first destination information to the second connection apparatus via the second network, and the second network device receiving the first destination information transmitted from the first connection apparatus, generating second destination information of a message to the device by appending an identifier for the device to an identifier of the second connection apparatus, and transmitting a message including the generated second destination information onto the third network.

Effects of the Invention

As described above, according to the present invention, the user can discover and use a device which is not present on the self-network.

As a result, connection to various devices connected to the networks can be easily made. Furthermore, the use opportunity of devices can be increased.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 5 is a conceptual view of a device management table;

FIG. 9 shows the configuration of a connection request SOAP message;

FIG. 10 shows the configuration of a connection request SOAP response message;

FIG. 11 shows the configuration of a disconnection request SOAP message;

FIG. 12 shows the configuration of a remote device information SOAP message;

FIG. 13 is a conceptual view of an SCPD;

FIG. 14 shows the configuration of a device control information SOAP message;

FIG. 15 shows the configuration of an event subscription request SOAP message;

FIG. 16 shows the configuration of an event processing information SOAP message;

FIG. 19 is a conceptual view of a management table;

FIG. 20 is a conceptual view of a UPnP device proxy apparatus registration and connection window of a user PC; and FIG. 21 shows the configuration of an UPnP device proxy apparatus registration SOAP message.

BEST MODE FOR CARRYING OUT THE INVENTION

Preferred embodiments of the present invention will be described hereinafter with reference to the accompanying drawings. In the preferred embodiments, a UPnP device proxy apparatus is provided, scans UPnP protocol messages, acquires device information (device description) and service information (service description) of a device, transfers these pieces of information to a UPnP device proxy apparatus which forms a pair, and reproduces a virtual PnP compatible device on the UPnP device proxy apparatus.

<Overall Arrangement of System>

Figure 1:
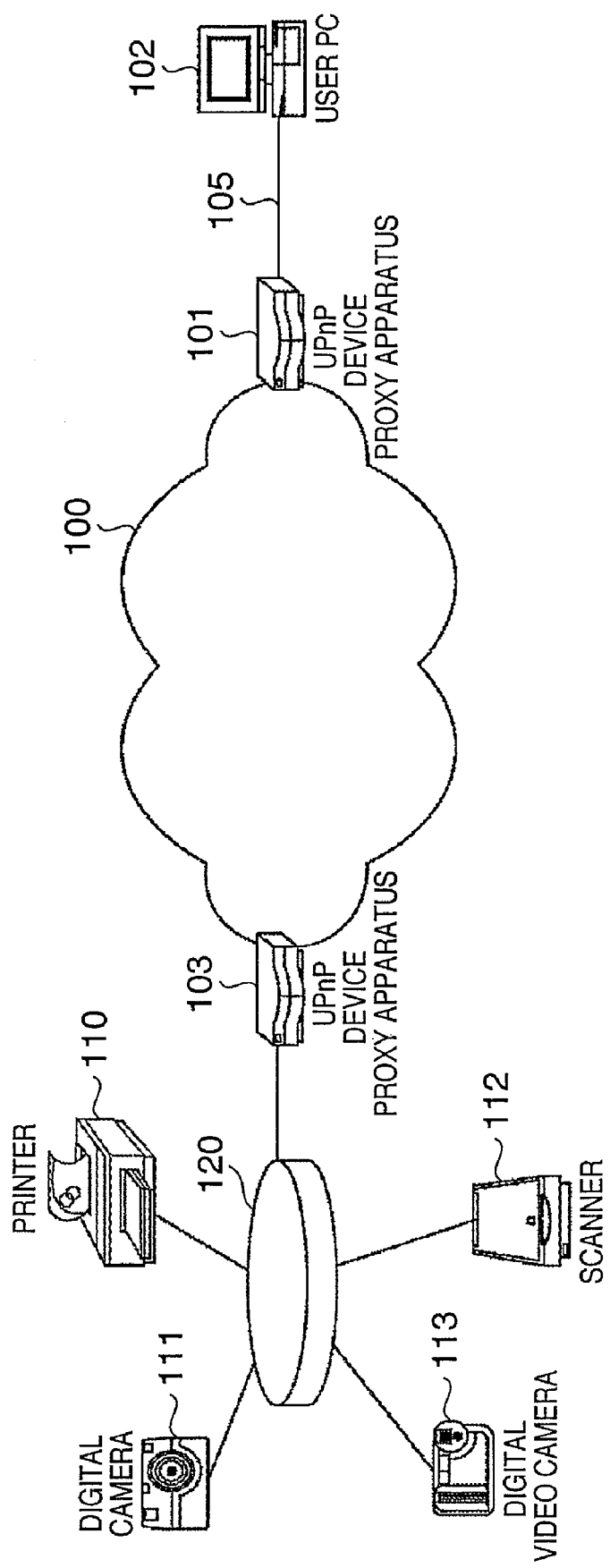
FIG. 1 is a diagram showing the overall arrangement of a system.

FIG. 1 is a diagram showing the overall arrangement of a system according to an embodiment of the present invention. As shown in FIG. 1, a user PC 102 as a computer system such as a PC or the like is connected to an external network 100 such as the Internet or the like via an UPnP device proxy apparatus 101. A different subnet is connected to the external network 100 via an UPnP device proxy apparatus 103, and a printer 110, a digital camera 111, a scanner 112, and a digital video camera 113 as UPnP compatible devices are connected to that network 120. In this embodiment, the aforementioned devices are exemplified, but the present invention is not limited to these specific devices.

The UPnP device proxy apparatus 103 is a first connection apparatus, and the UPnP device proxy apparatus 101 is a second connection apparatus. The UPnP device proxy apparatus 103 is connected to the first network 120 and the second network 100, and the UPnP device proxy apparatus 101 is connected to the second network 100 and a third network 105.

This embodiment notifies the user PC 102 as an apparatus connected to the third network 105 of information regarding the devices 110, 111, 112, and 113 connected to the first network 120. That is, the UPnP device proxy apparatus 103 recognizes devices connected to the first network 120, and transmits information regarding the recognized devices to the UPnP device proxy apparatus 101 via the second network 100. The UPnP device proxy apparatus 101 receives the information transmitted from the UPnP device proxy apparatus 103, and transmits, based on the received information, a message indicating that the recognized devices are available onto the third network 105.

This embodiment notifies the user PC 102 as an apparatus connected to the third network 105 of destination information (URL) of a message to a device (e.g., the printer 110) connected to the first network 120. That is, the UPnP device proxy apparatus 103 acquires first destination information (URL) of a message to the printer 110 connected to the first network 120, and transmits the acquired first destination information (URL) to the UPnP device proxy apparatus 101 via the second network 100. The UPnP device proxy apparatus 101 receives the first destination information (URL) transmitted from the UPnP device proxy apparatus 103, generates second destination information (URL) of a message to the printer 110 by appending an identifier (port number) for the printer 110 to an identifier (IP address) of the UPnP device proxy apparatus 101, and transmits a message including the generated second destination information (URL) onto the third network.

Furthermore, upon reception of a first transmission message having the second destination information (URL) as an address from the user PC 102, the UPnP device proxy apparatus 101 transmits a second transmission message which includes the first destination information (URL) corresponding to the identifier (port number) included in the second destination information (URL) and the contents of the first transmission message to the UPnP device proxy apparatus 103. The UPnP device proxy apparatus 103 receives the second transmission message transmitted from the UPnP device proxy apparatus 101, and transmits a third transmission message including the contents of the first transmission message to have the first destination information as an address.

The user PC 102 in FIG. 1 is so-called a computer having various functions that allow the user to use devices across the Internet 100, to browse resources, and so forth, and is a computer system which comprises a CPU, ROM, RAM, HDD, and the like.

This embodiment will explain a case wherein only one computer system is connected for the sake of simplicity. However, the present invention can be similarly applied to a case wherein a plurality of user PCs 102 are present in a single segment.

Furthermore, the network 105 on the user PC 102 side and the network 103 on the UPnP compatible device side have one-to-one correspondence. This mode is adopted for the sake of convenience to simplify the embodiments. However, the present invention can be similarly applied to a 1-to-n or n-to-n configuration.

<Computer System Block Diagram>

Figure 2:
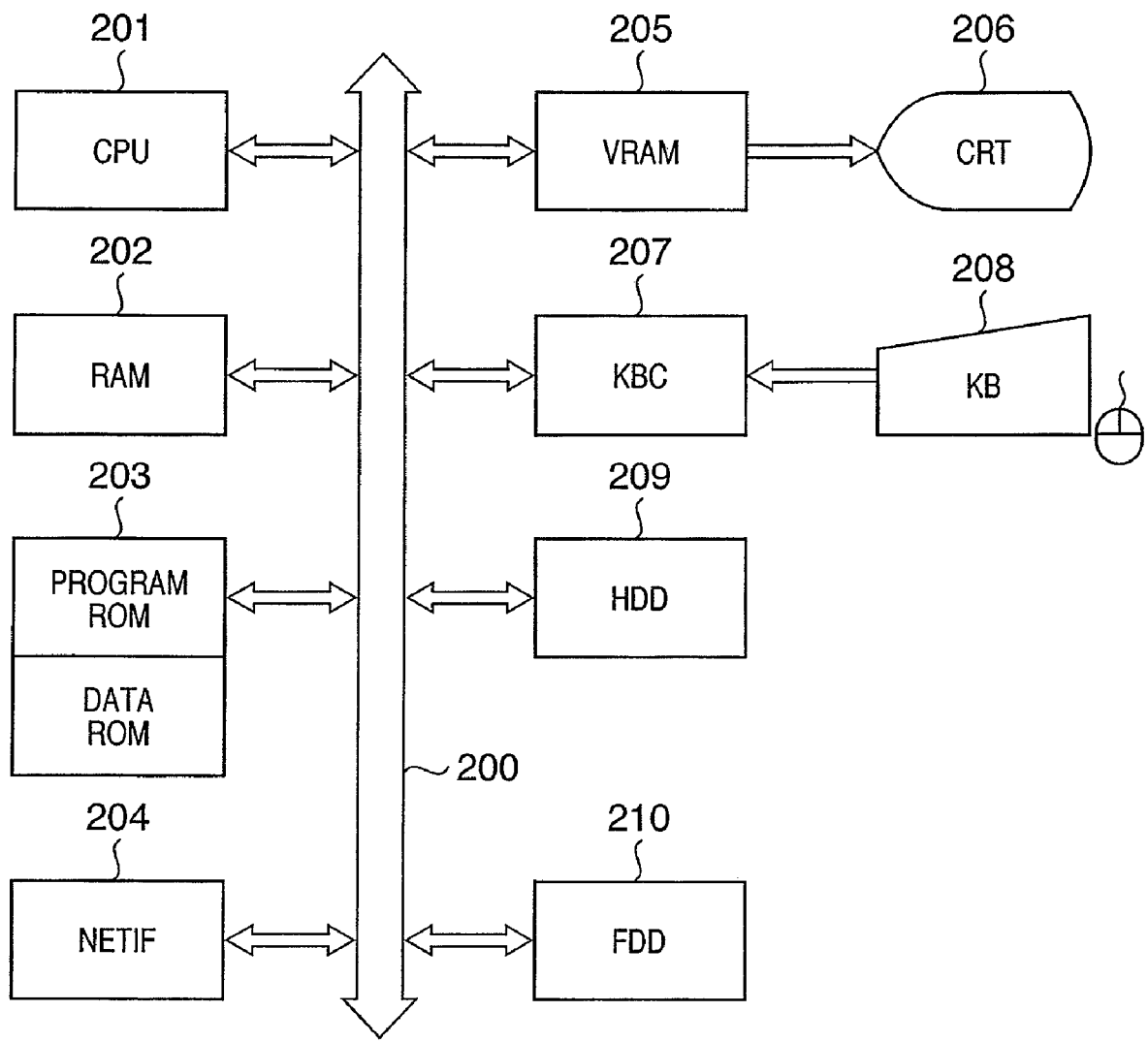
FIG. 2 is a block diagram of a computer system.

FIG. 2 is a block diagram showing the arrangement of a computer system of the user PC 102 exemplifying one embodiment of the present invention.

Reference numeral 201 in FIG. 2 denotes a central processing unit (to be abbreviated as a CPU hereinafter) which controls an information processing apparatus.

Reference numeral 202 denotes a random access memory (to be abbreviated as a RAM hereinafter), which serves as a main memory of the CPU 201, and as an area for execution programs, and an execution area and data area of these programs.

Reference numeral 203 denotes a read-only memory (to be abbreviated as a ROM hereinafter) which stores the operation processing sequence of the CPU 201. The ROM 203 includes a program ROM that records an Operating System (to be abbreviated as an OS hereinafter) as a system program for making device control of the information processing apparatus, and a data ROM that records information required to operate the system and the like. An HDD 209 (to be described later) may often be used in place of the ROM 203.

Reference numeral 204 denotes a network interface (NETIF) which controls data transfer between information processing apparatuses via a network, and diagnoses the connection status.

Reference numeral 205 denotes a video RAM (VRAM), which maps an image to be displayed on the screen of a CRT 206 (to be described later) indicating the operating state of the information processing apparatus and controls its display. Reference numeral 206 denotes a display device which comprises a display or the like. The display device 206 will be abbreviated as a CRT hereinafter.

Reference numeral 207 denotes a controller which controls an input signal from an external input device 208 (to be described below). Reference numeral 208 denotes an external input device which accepts operations made for the information processing apparatus by its user, and comprises, e.g., a keyboard and a pointing device such as a mouse or the like. The external input device 208 will be simply referred to as a KB hereinafter.

Reference numeral 209 denotes a hard disk drive (HDD) which is used to save application programs and data such as image information and the like. The application programs in this embodiment include software programs and the like which implement various processing components that form this embodiment.

Reference numeral 210 denotes an external input and output device such as a floppy® disk drive, CDROM drive, or the like, which inputs and outputs a removable disk and is used to read out application programs and the like from a medium. The external input and output device 210 will be simply referred to as an FDD hereinafter. Note that the FDD 210 may store the application programs and data stored in the HDD 209 when they are used.

Reference numeral 200 denotes an input and output bus (address bus, data bus, and control bus) which interconnects the aforementioned units.

<Device Proxy Device Block Diagram>

Figure 3:
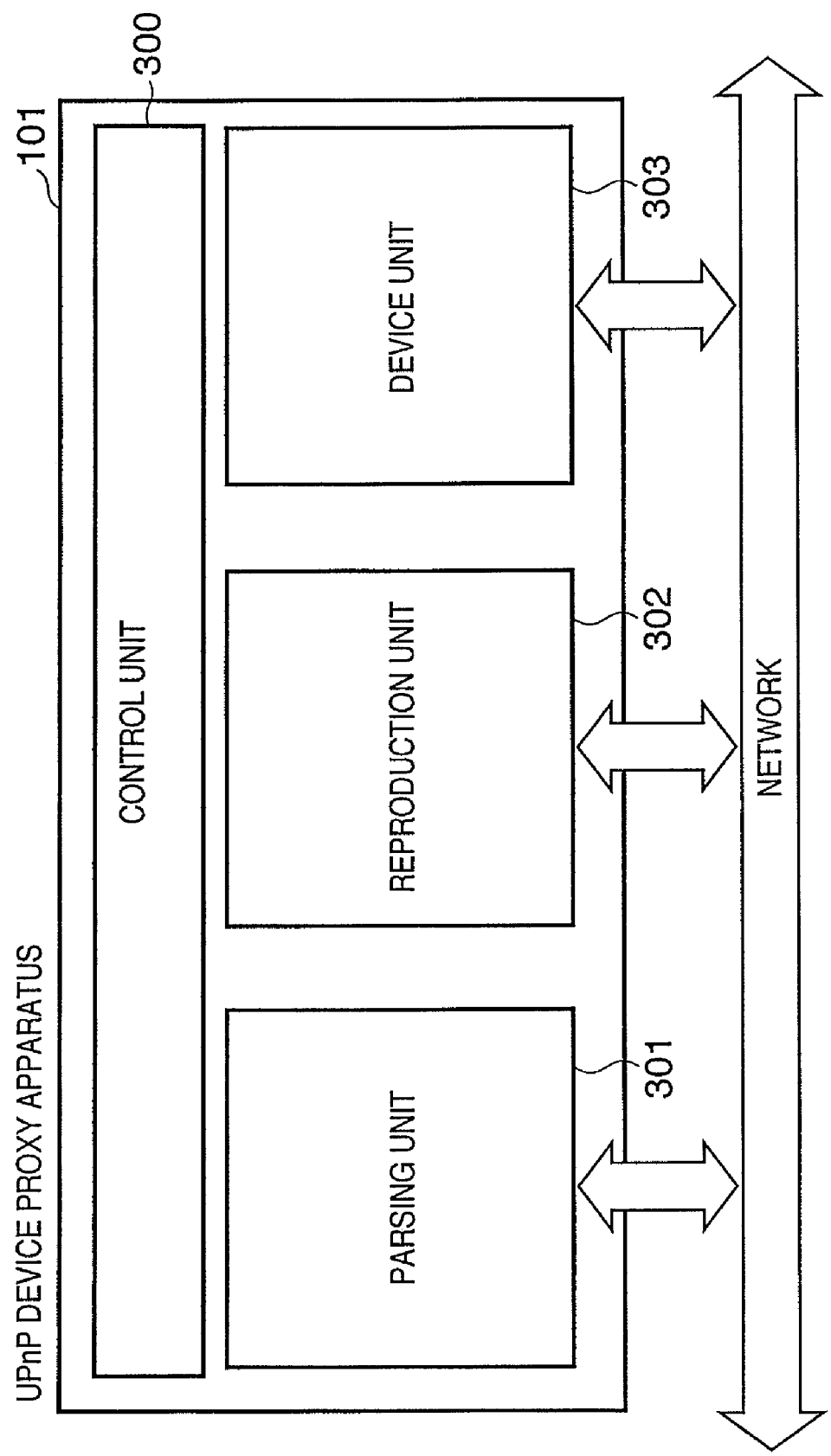
FIG. 3 is a block diagram of an UPnP device proxy apparatus.

FIG. 3 is a block diagram showing the arrangement of the device proxy apparatus 101 exemplifying one embodiment of the present invention. The device proxy apparatus 101 includes a mode for implementing its functions using a computer system and a mode mounted as a dedicated device. The embodiment of the present invention can implement both the modes. FIG. 3 will explain the arrangement of the device proxy apparatus 101. However, the device proxy apparatus 103 also has the same arrangement. In the mode for implementing the device proxy apparatus 101 or 103 by the computer system, the system arrangement is common to that shown in FIG. 2, and FIG. 3 shows the configuration of software modules.

The UPnP device proxy apparatus 101 comprises a control unit 300, parsing unit 301, reproduction unit 302, and device unit 303.

The control unit 300 has a function of controlling the parsing unit 301, reproduction unit 302, and device unit 303.

The parsing unit 301 has a function of receiving and parsing UPnP protocol messages, a function of processing XML data, and a function of storing the IP address, control URL, event URL, and the like of a device.

The reproduction unit 302 has a function of generating a virtual device based on the device description and service description of a device.

The device unit 303 has a function that allows itself, i.e., the UPnP device proxy apparatus 101 to serve as an UPnP device, and a function that allows it to serve as a virtual device. In the example of FIG. 1, the reproduction unit 302 generates four device units 303 corresponding to four devices from the printer 110 to the digital video 113.

<Procedure of Overall System Processing>

The procedure of the overall processing of the system according to the embodiment of the present invention will be described below using FIG. 1.

Assume that only the printer 110 is connected to the network 120 except for the UPnP device proxy apparatus 103, and the user PC 102 uses the printer 110 via the network 100 such as the Internet or the like, for the sake of simplicity. In this case, the printer 110 is used as a representative device in a description. Instead, the processing of other UPnP. compatible devices such as the digital camera 111, scanner 112, digital video camera 113, and the like except for functions unique to individual devices can be similarly implemented.

The user PC 102 discovers the UPnP device proxy apparatus 101, and issues a connection request to the UPnP device proxy apparatus 103 to the UPnP device proxy apparatus 101.

On the other hand, on the network 120, Alive messages (messages each indicating that the self device is available on the network) of an SSDP (Simple Service Discovery Protocol, to be abbreviated as SSDP; the SSDP is a device discovery protocol specified by the UPnP) are broadcasted. The UPnP device proxy apparatus 101 always receives these messages, and internally holds the received messages (the device 101 recognizes the printer 110 based only on this message).

Upon reception of the connection request from the UPnP device proxy apparatus 101, the UPnP device proxy apparatus 103 transmits an SSDP search message onto the network 120, to which the self-device belongs, and waits for a response. Upon reception of the response, the UPnP device proxy apparatus 103 acquires information regarding an UPnP compatible device connected to the network 120, to which the self-device belongs, from the response message. In this case, the UPnP device proxy apparatus 103 recognizes the printer 110.

The UPnP device proxy apparatus 103 transmits the acquired device and service descriptions of the printer 110 and required information to the UPnP device proxy apparatus 101 as a SOAP message.

The UPnP device proxy apparatus 101 receives the transmitted information above, and generates a virtual printer 110V having the UPnP functions. The virtual printer 110V (i.e., the device unit 303 of the UPnP device proxy apparatus 101) transmits an SSDP Alive message onto the network 105.

That is, the UPnP device proxy apparatus 103 as the first connection apparatus recognizes the device 110 connected to the first network 120, and transmits information regarding the recognized device to the UPnP device proxy apparatus 101 as the second connection apparatus via the second network 100. The UPnP device proxy apparatus 101 receives the information transmitted from the UPnP device proxy apparatus 103, and transmits, based on the received information, a message (Alive message) indicating that the recognized device is available onto the third network 105.

The user PC 102 receives the SSDP Alive message, and discovers the virtual printer 110V. Alternatively, the user PC 102 transmits an SSDP search message onto the network 105, and receives a response (a message indicating that a device having the recognized functions is available) from the UPnP device proxy apparatus 101.

The user PC 102 opens a presentation page of the virtual printer 110V using a browser or the like, and issues a print request. Alternatively, the user PC 102 issues a print request according to a control protocol specified by the UPnP using a dedicated application.

Upon reception of the print request, the virtual printer 110V (i.e., the device unit 303 of the UPnP device proxy apparatus 101) transmits that print request to the UPnP device proxy apparatus 103.

Upon reception of the print request, the UPnP device proxy apparatus 103 transmits that message to the printer 110. The UPnP device proxy apparatus 103 receives a response to the above print request from the printer 110, and transmits that message to the UPnP device proxy apparatus 101.

Upon reception of the response to the above print request, the UPnP device proxy apparatus 101 transmits that message to the user PC 102.

The user PC 102 issues a disconnection request to the UPnP device proxy apparatus 101.

Embodiment 1

In embodiment 1, the procedures of the detailed processes of the respective processes of the above embodiment will be described below based on the above description. In the following description of embodiment 1, the overall system arrangement diagram, computer system block diagram, and UPnP device proxy apparatus block diagram are common to FIGS. 1 to 3. Message exchanges between the UPnP device proxy apparatuses use SOAP, which applies to all message exchanges between the UPnP device proxy apparatuses to be described hereinafter.

<Module Arrangement and Function of Parsing Unit>

Figure 4:
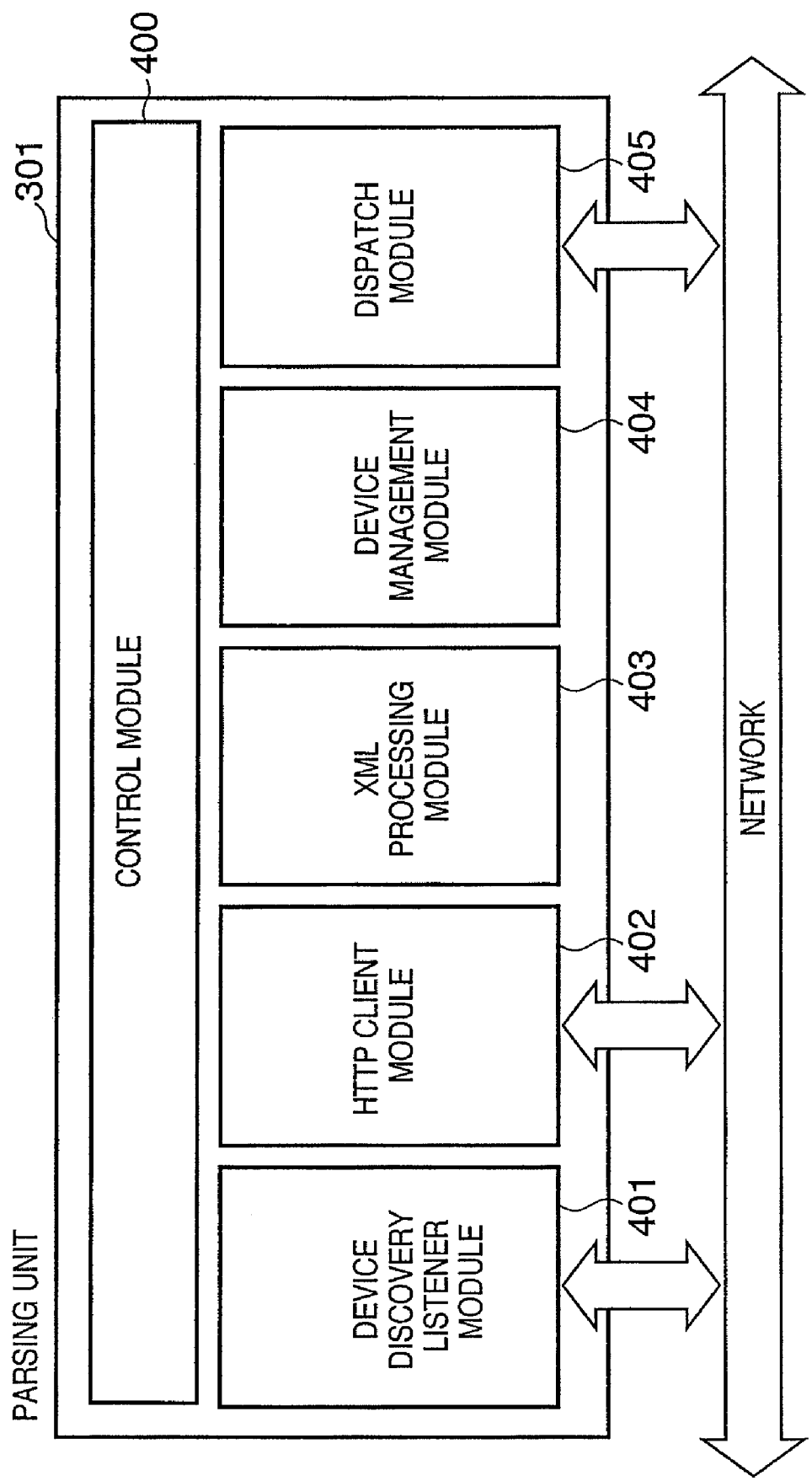
FIG. 4 is a block diagram showing the module arrangement of a parsing unit.

FIG. 4 is a block diagram showing the module arrangement of the parsing unit 301 exemplifying one embodiment of the present invention.

The parsing unit 301 comprises a control module 400, device discovery listener module 401, HTTP client module 402, XML processing module 403, device management module 404, and dispatch module 405.

The control module 400 has a function of controlling the device discovery listener module 401, HTTP client module 402, XML processing module 403, and device management module 404, exchanging data with interfaces of respective modules, and so forth.

The device discovery listener module 401 has a function of receiving an SSDP message, device search request, and device announce.

The HTTP client module 402 has a function of acquiring a specific document via an HTTP (Hyper Text Transfer Protocol; to be abbreviated as an HTTP hereinafter).

The XML processing module 403 has a function of parsing XML data and a function of performing extraction, addition, change, deletion, and the like of elements.

The device management module 404 has a device management table 500 (to be described later) used to manage device information acquired from the device discovery listener module 401, and has a function of making search, addition, change, and deletion of data with respect to that table.

The dispatch module 405 has an HTTP server function of receiving commands and messages transmitted from the device proxy apparatus 101 which forms a pair, a function of transmitting a device control command and event processing command to a real device, and a function of receiving an event message.

<Device Management Table>

FIG. 5 is a conceptual view of the device management table 500 held by the device management module 404 exemplifying one embodiment of the present invention.

The device management table 500 includes a UDN item 501, DescURL item 502, LifeTime item 503, and LatestTime item 504. The device management table 500 allows to make search, read/write, addition, and deletion of the respective items, and one item uniquely specifies other items.

The UDN item 501 is an identifier used to identify a device, and stores a UDN tag value of the device description. The DescURL item 502 stores the URL of the device description held by the device.

The LifeTime item 503 stores the value of an announce lifetime in an SSDP device announce, e.g., an HTTP header "CACHE-CONTROL:MAX-AGE" of an SSDP NOTIFY command. The LatestTime item 504 stores the latest time of issuance of an SSDP Alive message of each device.

<Module Arrangement and Function of Reproduction Unit>

Figure 6:
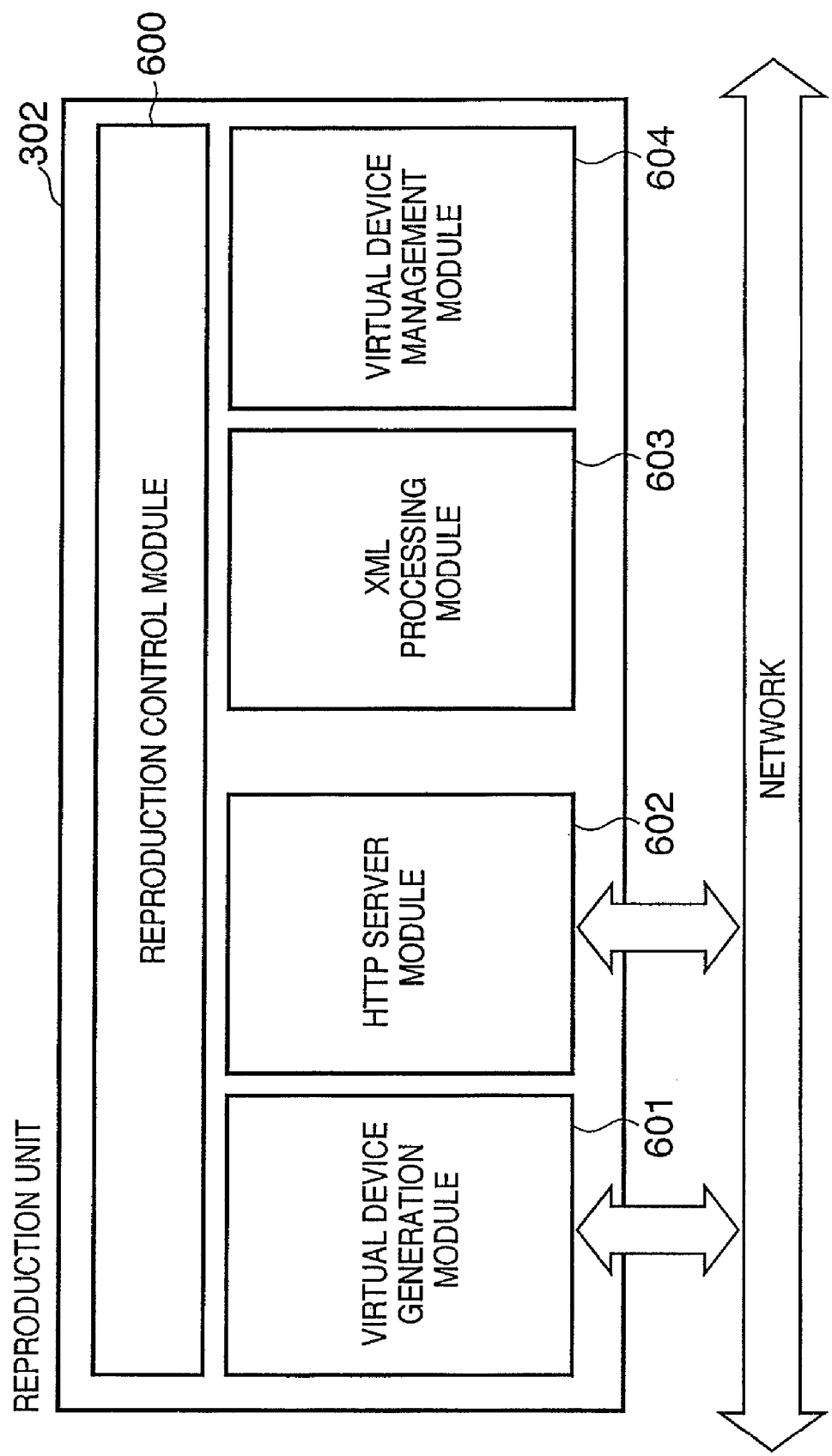
FIG. 6 is a block diagram showing the module arrangement of a reproduction unit.

FIG. 6 is a block diagram showing the module arrangement of the reproduction unit 302 exemplifying one embodiment of the present invention.

The reproduction unit 302 comprises a reproduction control module 600, virtual device generation module 601, HTTP server module 602, XML processing module 603, and virtual device management module 604.

The reproduction control module 600 has a function of controlling the virtual device generation module 601, HTTP server module 602, XML processing module 603, and virtual device management module 604, exchanging data with interfaces of respective modules, and so forth.

The virtual device generation module 601 has a function of generating a virtual device on the basis of the device and service descriptions.

The HTTP server module 602 is a so-called HTTP server, and has a function of providing a document and the like in response to a request from a client.

The XML processing module 603 has the same function as that of the XML processing module 403.

The virtual device management module 604 has a virtual device management table 700 (to be described later) used to store information regarding a real device, and has a function of making search, addition, change, and deletion of data with respect to that table.

<Virtual Device Management Table>

Figure 7:
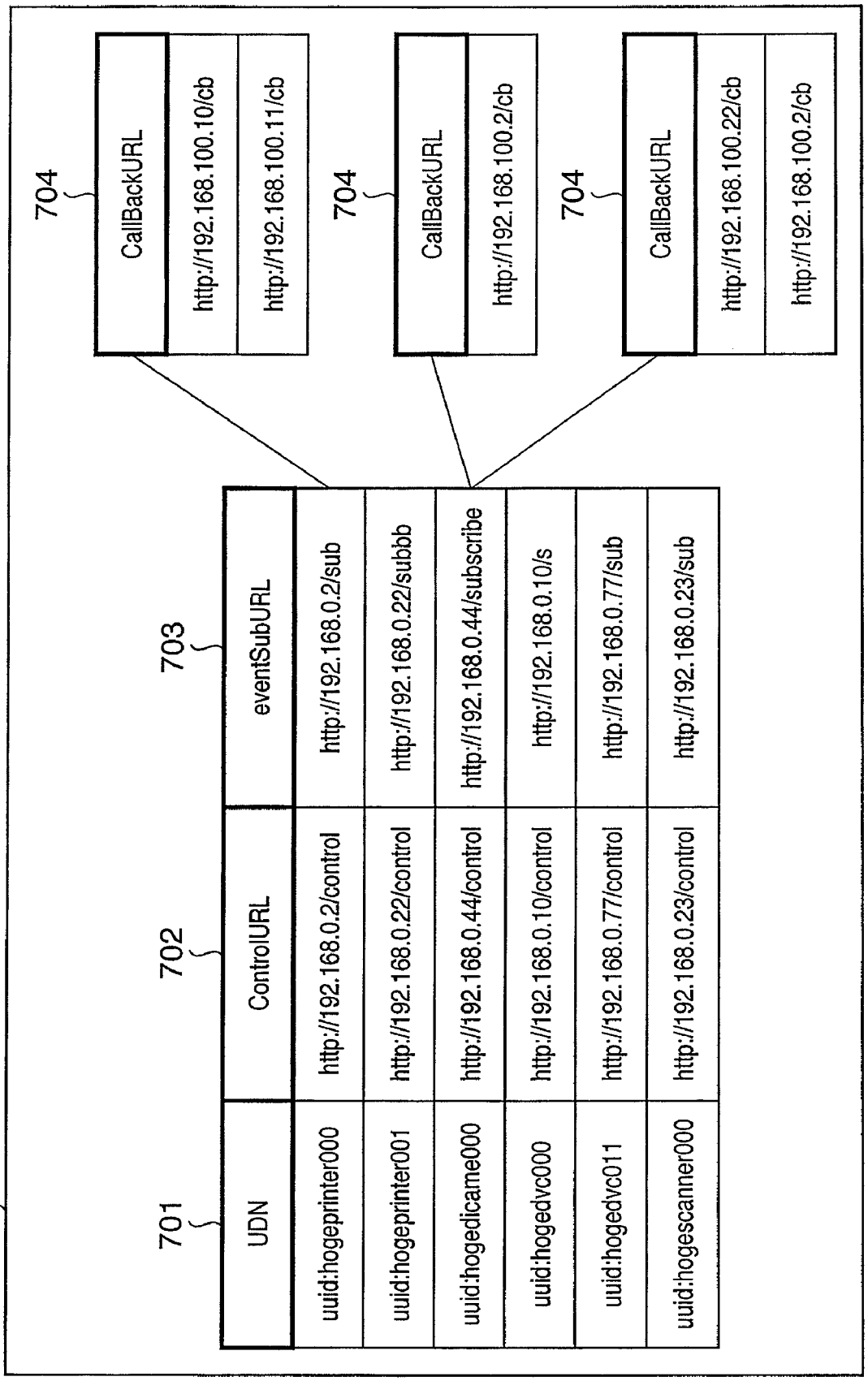
FIG. 7 is a conceptual view of a virtual device management table.

FIG. 7 is a conceptual view of the virtual device management table 700 held by the virtual device management module 604 exemplifying one embodiment of the present invention.

The virtual device management table 700 has a UDN item 701, ControlURL item 702, eventSubURL item 703, and CallBackURL item 704. The virtual device management table 700 allows to make search, read/write, addition, and deletion of the respective items, and one item uniquely specifies other items except for the CallBackURL item 704. Furthermore, one or more values of the CallBackURL item 704 associated with the uniquely specified record are specified.

The UDN item 701 is an identifier used to identify a device, and stores a UDN tag value of the device description.

The ControlURL item 702 stores the URL of an end point that accepts a control command of a real device, i.e., an original device. The eventSubURL item 703 stores the URL of the end point that subscribes an event of the real device, i.e., the original device. The CallBackURL item 704 stores the URL of the end point used to transmit an event message to the user PC 102 that has subscribed an event.

<Module Arrangement and Function of Device Unit>

Figure 8:
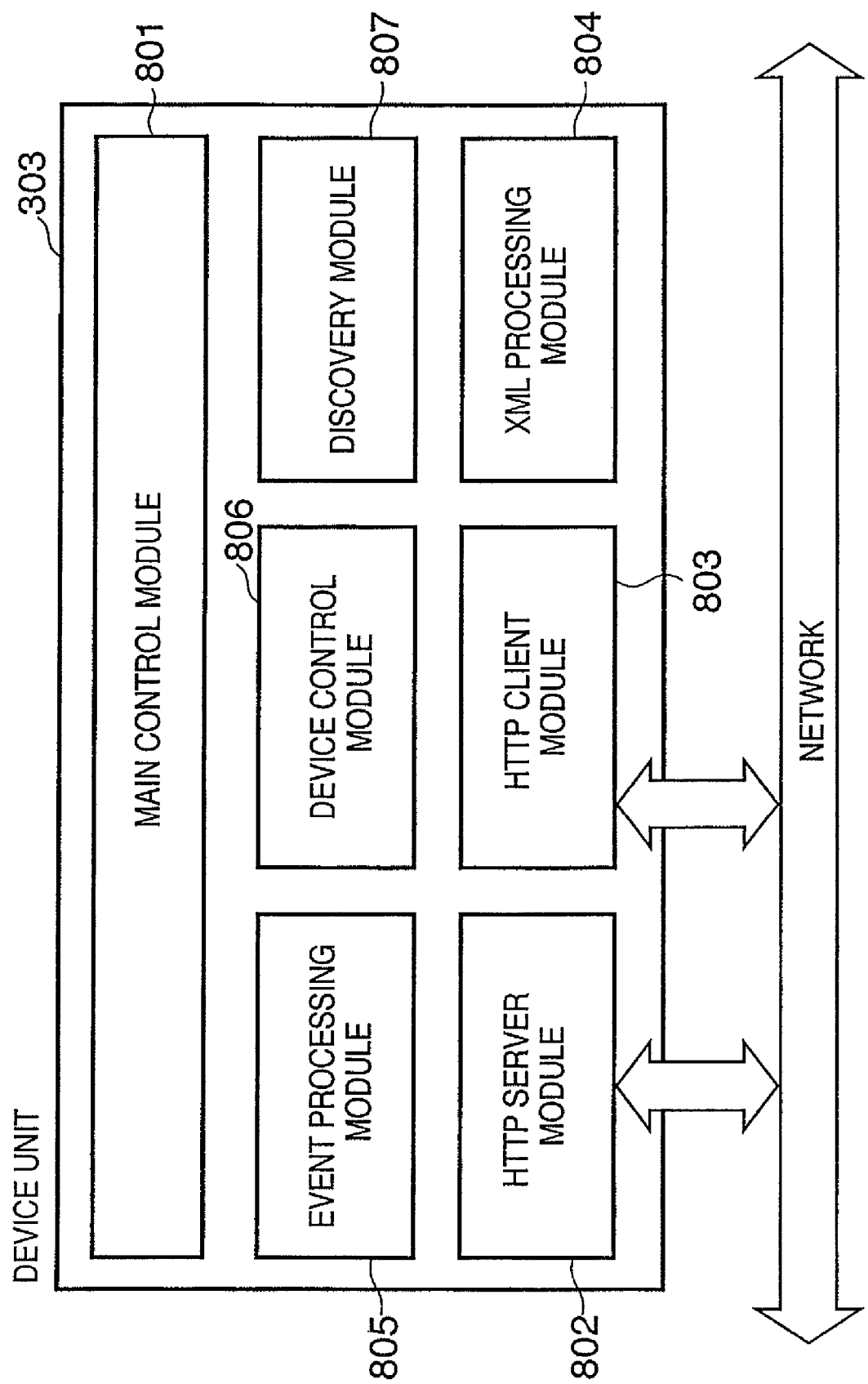
FIG. 8 is a block diagram showing the module arrangement of a device unit.

FIG. 8 is a block diagram showing the module arrangement of the device unit 303 exemplifying one embodiment of the present invention.

The device unit 303 comprises a main control module 801, HTTP server module 802, HTTP client module 803, XML processing module 804, event processing module 805, device control module 806, and discovery module 807.

The main control module 801 has a function of controlling the HTTP server module 802, HTTP client module 803, XML processing module 804, event processing module 805, device control module 806, and discovery module 807, exchanging data with interfaces of respective modules, and so forth. Furthermore, the main control module 801 has a function of holding and providing the self device description, service description, and presentation document, and a function of providing a function required to connect the UPnP device proxy apparatus 101 on the external network.

The HTTP server module 802 has the same function as that of the HTTP server module 602.

The HTTP client module 803 has the same function as that of the HTTP client module 402.

The XML processing module 804 has the same function as that of the XML processing module 403.

The event processing module 805 has a function of satisfying a protocol GENA (Generic Event Notification Architecture; to be abbreviated as GENA hereinafter) of device events specified by the UPnP, and also has a function of an event subscription and issuing an event to the user PC 102 and the like.

The device control module 806 has a function of receiving and parsing a SOAP (see W3C XML Protocol Working Group) message as a control protocol specified by the UPnP, and executing real or virtual processing according to that command.

The discovery module 807 has a function of satisfying the SSDP as the device discovery protocol specified by the UPnP, and a function of executing response processing to an Alive announce, ByeBye announce, and search.

<Discovery of UPnP Device Proxy Device 101>

The UPnP device proxy apparatus 101 itself is implemented as an UPnP compatible device, and an external device in the same network 105 can discover and use the UPnP device proxy apparatus 101 in the process specified by the UPnP.

The method of allowing the user PC 102 to discover the UPnP device proxy apparatus 101 includes two methods, i.e., a method of receiving an SSDP Alive message issued by the UPnP device proxy apparatus 101 and a method of transmitting a search message from the user PC 102 onto the network 105, and receiving a response to that message returned from the UPnP device proxy apparatus 101. These methods are based on the Discovery protocol specified by the UPnP.

As the discovery unit of the user PC 102, Windows® XP as an OS available from Microsoft Corporation incorporates a UPnP client function as a standard function, and when the user PC 102 uses this OS, reception of an SSDP Alive message, transmission of an SSDP search message, and the like are automatically done. Also, a dedicated application which performs the above discovery process can be used as the discovery unit.

The embodiment of the present invention will give a description under the assumption that the user PC 102 uses Windows® XP as the OS.

Upon completion of the discovery process, an icon indicating the UPnP device proxy apparatus 101 appears in a "My Network" folder of Explorer (available from Microsoft Corporation).

Upon double-clicking the icon, a browser such as Internet Explorer (available from Microsoft Corporation) or the like is launched to display a page including a text input area used to input a connection destination.

<UPnP Device Proxy Device Connection Processing>

The user inputs the IP address or host name of the UPnP device proxy apparatus 103 to the text input area of the browser, and presses a connection button. Upon pressing of the connection button, the browser transmits a connection request message to the UPnP device proxy apparatus 101.

The HTTP server module 802 of the UPnP device proxy apparatus 101 receives the connection request message. The main control module 801 acquires the IP address or host name of the input connection destination (UPnP device proxy apparatus 103) input via the browser from the received message.

The main control module 801 transmits a SOAP message, which describes an operation name "connect" and the IP address or host name of the UPnP device proxy apparatus 101 as its argument, as shown in FIG. 9, to the UPnP device proxy apparatus 103 via the HTTP client module 803.

The HTTP server module 802 of the UPnP device proxy apparatus 103 receives the connection request SOAP message. The XML processing module 804 processes the received message to acquire the IP address or host name of the UPnP device proxy apparatus 101, and the main control module 801 passes it to the control unit 300. The control unit 300 then passes the IP address or host name to the control module 400 of the parsing unit 301.

The main control module 801 of the UPnP device proxy apparatus 101 returns a SOAP Response message, which describes the IP address or host name of the UPnP device proxy apparatus 103 as a return value, as shown in FIG. 10, as a response to the connection request SOAP message received previously, to the UPnP device proxy apparatus 101 via the HTTP client module 803.

<Acquisition of UPnP Device Information>

Upon completion of the above connection processing, the UPnP device proxy apparatus 103 starts to search for UPnP compatible devices connected to the network 120 to which the self-device belongs.

The control module 400 of the parsing module 301 creates an SSDP search message using the XML processing module 403, transmits it onto the network 120 via the HTTP client module 402, and waits for a response. The control module 400 repeats this process at appropriate time intervals until the UPnP device proxy apparatus 101 issues a disconnection request.

Upon reception of a response from an UPnP compatible device during this repetition, the HTTP client module 402 receives the response message, and passes it to the control module 400.

Parallel to the aforementioned process, the device discovery listener module 401 prepares for reception of an SSDP NOTIFY message via the network 120. The UPnP compatible device broadcasts the SSDP NOTIFY message onto the network at predetermined time intervals. The device discovery listener module 401 continues the reception process until the UPnP device proxy apparatus 101 issues a disconnection request. Upon reception of the NOTIFY message, the device discovery listener module 401 passes that message to the control module 400.

The UPnP device proxy apparatus 103 acquires information associated with the device from the response to the search message or the NOTIFY message.

An example of the NOTIFY message is as follows.

NOTIFY*HTTP/1.1
HOST:239.255.255.250:1900
CACHE-CONTROL:max-age=30

LOCATION:http://192.168.1.11/printer/devicedsc.xml
NT:urn:schemas-upnp-org:printbasic:1
NTS:ssdp:alive
USN:uuid:upnp-printbasic111

Upon reception of the response or NOTIFY message, the control module 400 acquires the URL of a device description (the value of a LOCATION header is the URL of the device description), the UDN (the value of a USN header is the UDN), the value of the NTS header, and the value of CACHE-CONTROL from the message. The UPnP device proxy apparatus 103 can acquire these pieces of information from the response to the search message. The control module 400 passes the URL of the device description, the UDN, the value of the NTS header, and the value of CACHE-CONTROL to the device management module 404.

The device management module 404 that has acquired the above values searches the device management table 500 using the UDN value as a key. If a relevant record is found by the above search and its NTS header value is "SSDP:ALIVE", the device management module 404 updates the value of the LatestTime item 504 by the current time. If a record is found, and its NTS header value is "SSDP:BYEBYE", the device management module 404 deletes the relevant record.

If no relevant record is found by the above search, the device management module 404 inserts the URL of the device description, the UDN, the value of CACHE-CONTROL, and the current time in the items 502, 501, 503, and 504 of the table 500.

As described above, the UPnP device proxy apparatus 103 as the first connection apparatus recognizes the device connected to the first network 120. Also, the UPnP device proxy apparatus 103 as the first connection apparatus acquires the destination information (the URL of the device description) of a message to the device connected to the first network 120.

<Transfer of UPnP Device Information>

After the above process, if the aforementioned record is found and its NTS header value is "SSDP:BYEBYE", the device management module 404 creates a SOAP message shown in FIG. 11 using an operation name "byebye" and the acquired UDN value as its argument.

If no relevant record is found, the device management module 404 acquires the device and service descriptions from the URL of the device description (the value of the item 502 in FIG. 5), and creates a SOAP message which describes an operation name "remoteAlive", and the UDN (the value of the item 501 in FIG. 5) and the IP address or host name of the UPnP device proxy apparatus 103 as its arguments, and is attached with the acquired device and service descriptions as its attachments, as shown in FIG. 12, using both the values inserted in the above-mentioned record. The device management module 404 generates an element of an URLBase tag based on the URL of the acquired device description, and puts it in the attachment of this SOAP message. "URLBase" will be described later. The device management module 404 transmits the created message to the UPnP device proxy apparatus 101. Note that the device description is information associated with a device, and includes a device type, vendor name, model name, serial number, and the like specified by the UPnP. The service description is a description of interfaces of services (print and the like in case of a printer) provided by that device. These pieces of information are acquired from the URL of the device description.

As described above, the UPnP device proxy apparatus 103 as the first connection apparatus recognizes the device (e.g., the printer 110) connected to the first network 120, and transmits the information regarding the recognized device to the UPnP device proxy apparatus 101 as the second connection apparatus via the second network 100. In this recognition, the UPnP device proxy apparatus 103 acquires information (URL) of the storage location of the device description held by the device from the message (the response message to the search message or the NOTIFY message) from the device (e.g., the printer 110). The UPnP device proxy apparatus 103 acquires the information (device and service descriptions) of the device from the information (URL) of the storage location of the device description. An example of this device information includes the type of that device, and another example includes the services or functions (e.g., print and the like) provided by that device.

The UPnP device proxy apparatus 103 as the first connection apparatus acquires the destination information (URLBase) of a message to the device (e.g., the printer 110) connected to the first network 120, and transmits the acquired destination information (URLBase) to the UPnP compatible device 101 as the second connection apparatus via the second network 100.

The above processes of message creation and message transmission are repeated with the aforementioned information acquisition process.

<Generation and Extinction of Virtual UPnP Device>

The HTTP server module 602 of the UPnP compatible device 101 receives the SOAP message transmitted from the UPnP device proxy apparatus 103. That is, the HTTP server module 602 serves as first connection unit connected to the second network 100, and receives first destination information (URLBase) of a message to the device (e.g., the printer 110) connected to the first network 120 from the UPnP device proxy apparatus 103 as the connection apparatus via the second network 100.

The HTTP server module 602 passes the received SOAP message to the reproduction control module 600, which processes the message using the XML processing module 603. The reproduction control module 600 extracts the operation name, argument part, and the like of the SOAP message from the processing result.

If the operation name is "byebye", the reproduction control module 600 passes the UDN as the argument value of the SOAP message to the virtual device management module 604. Upon reception of only the UDN, the virtual device management module 604 searches the virtual device management table 700 using the UDN as a key and deletes a relevant record. Furthermore, the virtual device management module 604 sends a processing request for issuing an SSDP:BYEBYE message to the generated virtual device to the control unit 300. The control unit 300 instructs the discovery module 807 to issue SSDP:BYEBYE including the UDN as an argument to the main control module 801. The discovery module 807 that has received the instruction transmits an SSDP:BYEBYE message including the UDN as an argument (a message which notifies that the device of that UDN is unavailable) onto the network 105. After that, the main control module 801 ends its own process.

If the operation name is "remoteAlive", the reproduction control module 600 passes the UDN as the argument value and the IP address or host name of the UPnP device proxy apparatus 103, and the device and service descriptions of the SOAP message (FIG. 12) to the virtual device management module 604.

Upon reception of these values, the virtual device management module 604 extracts the values of the "ControlURL" tag and "eventSubURL" tag from the device description using the XML processing module 603. The virtual device management module 604 inserts the extracted values into the items 702 and 703 of the virtual device management table 700 and the UDN in the item 701 of the virtual device management table 700. Furthermore, the virtual device management module 604 rewrites elements of tags as follows to create information shown in FIG. 13.

The module 604 rewrites the element of a "friendlyName" tag by a value obtained by appending, to an original value (the value included in the message of the operation name "remoteAlive" shown in FIG. 12), the IP address or host name of the UPnP device proxy apparatus 103 and "." . "friendlyName" represents a (human-readable) device name.

The module 604 rewrites the element of an "URLBase" tag by the URL obtained by combining the IP address of the UPnP device proxy apparatus 101 and the port number. URLBase is the URL used as a base for accessing a device. This port number corresponds to the UDN (the identifier used to identify the device), and the UPnP device proxy apparatus 101 identifies the target device using this port number.

The module 604 rewrites the element of an "SCPDURL" tag by "/service/service.xml". "SCPDURL" is the URL indicating an XML file that describes services provided by the device. The module 604 rewrites the element of a "ControlURL" tag by "/control". The module 604 rewrites the element of an "eventSubURL" tag by "/event".

The virtual device management module 604 creates a presentation page based on the service description, and creates a new device unit process using the written device description and the service description.

The main control module 801 of the generated device unit transmits an SSDP:ALIVE message onto the network 105. The SSDP:ALIVE message includes the URL of the device description (the value of the LOCATION header), the UDN (the value of the USN header is the UDN), the value of the NTS header (SSDP:ALIVE), and the value of CACHE-CONTROL as in the NOTIFY message described in <Acquisition of UPnP Device Information>. The URL of the device description includes the value of URLBase, which is rewritten, as described above. The value of CACHE-CONTROL is a predetermined value (e.g., 20 sec).

That is, the main control module 801 serves as second connection unit which is connected to the third network 105 and receives a message to the predetermined address (the IP address of the UPnP device proxy apparatus 101). Also, the virtual device management module 604 serves as generation unit which generates second destination information (URLBase) of a message to the device by appending the identifier (port number) for the device to the predetermined address (the IP address of the UPnP device proxy apparatus 101). The main control module 801 transmits a message including the second destination information onto the third network.

As described above, the UPnP device proxy apparatus 101 as the second connection apparatus receives information transmitted from the UPnP device proxy apparatus 103 as the first connection apparatus, and transmits, based on the received information, a message (SSDP:ALIVE message) indicating that the recognized device is available onto the third network 105. This message includes information (URL) of the storage location of the device description. This information (URL) of the storage position is generated by combining the identification information (IP address) of the UPnP device proxy apparatus 101 and the identifier (port number) used to identify the device (URLBase).

The UPnP device proxy apparatus 101 as the second connection apparatus receives first destination information (URLBase) transmitted from the UPnP device proxy apparatus 103 as the first connection apparatus, generates second destination information (URLBase) of a message to the device by appending the identifier (port number) for the device (e.g., the printer 110) to the identifier (IP address) of the UPnP device proxy apparatus 101, and transmits a message (SSDP:ALIVE message) including the generated second destination information (URLBase) onto the third network. Note that the second destination information indicates the URL formed by combining the IP address of the UPnP device proxy apparatus 101 and the port number.

<Device Control Module and Event Processing Module in Device Unit>

As described above, the device control module 806 manipulates a real device upon reception of a control request from the UPnP client. However, the new device which is generated in this case is the virtual device 110V, which executes processing for transferring the control request to the real device 110.

Likewise, the event processing module also transfers event subscribe and event issuance requests to the real device 110.

The aforementioned implementation is programmed to execute versatile transfer processing since it does not depend on the functions of various real devices.

<Control of Device>

The user PC 102 can control the virtual device discovered by the SSDP:ALIVE message or the like, as described above. The user PC 102 specifies this virtual device using URLBase included in the SSDP:ALIVE message.

Upon reception of a device control request from the user PC 102, the HTTP server module 802 of the UPnP device proxy apparatus 101 passes the request to the device control module 806. The address of this control request includes URLBase. The UPnP device proxy apparatus 101 specifies a virtual device to be controlled based on the port number included in this URLBase, and the corresponding device unit 303 receives and processes this control request.

Upon reception of the request, the device control module 806 requests the virtual device management module 604 to search for ControlURL of the UDN via the control unit 300 using the self UDN (the UDN corresponding to the port number included in URLBase) as a key. Upon reception of the search request, the virtual device management module 604 searches the virtual device management table 700 using the UDN. The virtual device management module 604 extracts the value of the ControlURL item 702 from a relevant record, and supplies it to the device control module 806 via the control unit 300.

Upon reception of the ControlURL value, the device control module 806 creates a SOAP message which describes an operation name "control" and the ControlURL value (the value appended with URLBase) as its argument value, and is attached with the request, as shown in FIG. 14, and transmits that message to the UPnP device proxy apparatus 103 via the HTTP client module 803.

More specifically, when the UPnP device proxy apparatus 101 as the second connection apparatus receives a first transmission message (control request) which has second destination information (URLBase) as an address from the user PC 102 as an apparatus connected to the third network 105, it transmits a second transmission message (SOAP message), which includes the first destination information (URLBase) corresponding to the identifier (port number) included in the second destination information (URLBase), and the contents of the first transmission message (control request), to the UPnP device proxy apparatus 103 as the first connection apparatus. The second destination information represents the URL as a combination of the IP address of the UPnP device proxy apparatus 101 and the port number.

Upon reception of the SOAP message, the dispatch module 405 of the parsing unit 301 of the UPnP device proxy apparatus 103 processes the message using the XML processing module 403, and acquires the argument of the operation and the attached message (the control request from the user PC 102).

The dispatch module 405 transmits the attached message as a SOAP message to the URL of the argument via the HTTP client module 402. That is, the UPnP device proxy apparatus 103 as the first connection apparatus receives the second transmission message (SOAP message) transmitted from the UPnP device proxy apparatus 101 as the second connection apparatus, and transmits a third transmission message (SOAP message), which includes the contents of the first transmission message (control request), to have the first destination information (URLBase) as an address.

After the dispatch module 405 waits for and receives a response to the SOAP message, it creates a SOAP response with an operation "control", and sends it back to the UPnP device proxy apparatus 101 to have a control response of the real device as an attachment.

Upon reception of the SOAP response, the device control module 806 of the device unit 303 of the UPnP device proxy apparatus 101 extracts the attached message from the SOAP response message using the XML processing module. 804, and returns it to the user PC 102 as a SOAP response.

<Device Event Subscribe>

Upon reception of a device event subscribe request from the user PC 102, the HTTP server module 802 of the UPnP device proxy apparatus 101 passes the value of CALLBACK included in the HTTP header of the event subscribe request to the event processing module 805.

The event processing module 805 which received the CALLBACK value requests the virtual device management module 604 to insert the CALLBACK value in the CallBackURL item of the self UDN via the control unit 300 to have that UDN as a key.

Upon reception of the request, the virtual device management module 604 searches the virtual device management table 700 using the UDN. The virtual device management module 604 inserts the CALLBACK value into the CallBackURL item 704 of a relevant record. Furthermore, the virtual device management module 604 acquires the value of the eventSubURL item 703 of the relevant record.

Upon reception of the value of the eventSubURL item 703, the event processing module 805 creates a SOAP message which includes an operation name "eventSub", and the UDN and the value of the eventSubURL item 703 as its argument values, as shown in FIG. 15, and transmits that message to the UPnP device proxy apparatus 103 via the HTTP client module 803.

Upon reception of the SOAP message, the dispatch module 405 of the parsing unit 301 of the UPnP device proxy apparatus 103 processes the message using the XML processing module 403, and acquires the argument of the operation.

The dispatch module 405 transmits an event subscribe message specified by the UPnP to the URL of the argument via the HTTP client module 402. In this case, the dispatch module 405 sets the value of the CALLBACK header such as http://192.168.1.21:8022/uuid:hogeprinter000/event using the UDN as the argument.

The dispatch module 405 transmits a SOAP response to the UPnP device proxy apparatus 101.

<Device Event Processing>

When an event is reported from the real device 110, the dispatch module 405 of the UPnP device proxy apparatus 103 receives it, and extracts a device UDN from the received directory name. The dispatch module 405 then creates a SOAP message which includes an operation name "event" and the UDN as its argument, and is attached with the event message reported from the device 110, as shown in FIG. 16, and transmits the created SOAP message to the UPnP device proxy apparatus 101.

The HTTP server module 602 of the UPnP device proxy apparatus 101 receives the SOAP message, and processes it using the XML processing module 603. The reproduction control module 600 acquires the UDN and attached message from the processing result.

The reproduction control module 600 requests the virtual device management module 604 to acquire the value of the CallBackURL item of the UDN via the control unit 300 to have the UDN as a key.

Upon reception of the request, the virtual device management module 604 searches the virtual device management table 700 using the UDN. The virtual device management module 604 extracts the value from the CallBackURL item 704 of a relevant record.

The reproduction control module 600 acquires the value of the CallBackURL item via the control unit 300, and transmits the attached message of the SOAP to that value.

Embodiment 2

Figure 17:
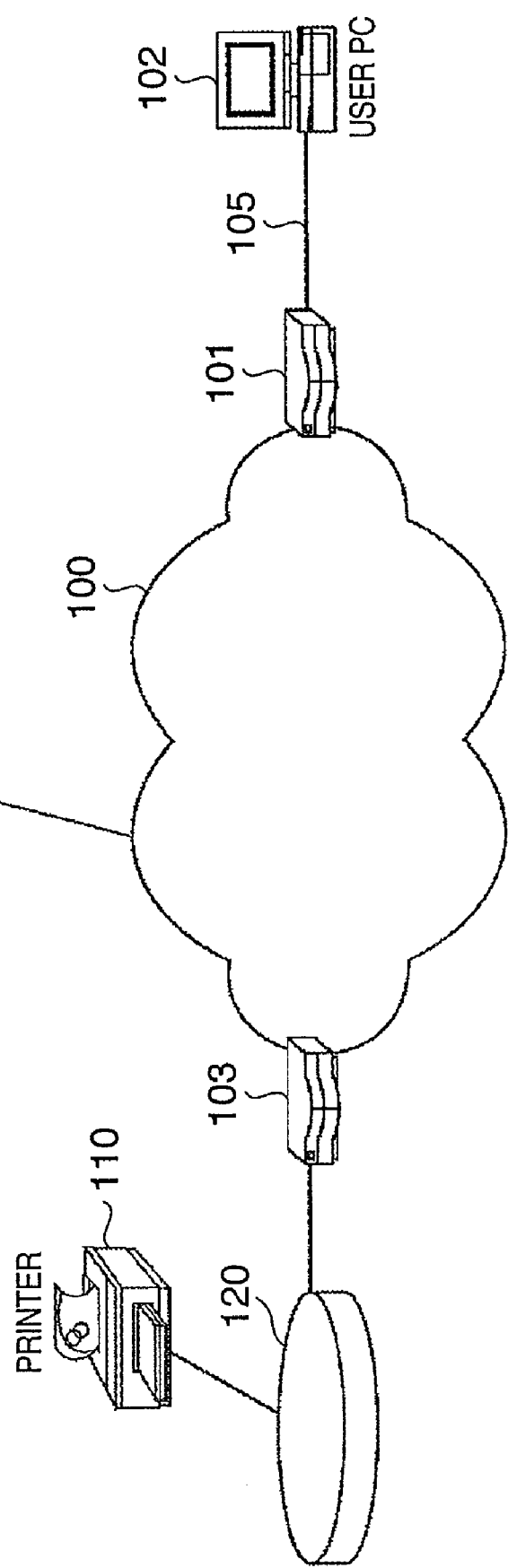
FIG. 17 is a diagram showing the arrangement of a system.

In the above description, in the UPnP device proxy apparatus connection processing, the IP address or host name of the UPnP device proxy apparatus 103 is input to the text input area of the browser. Alternatively, the UPnP device proxy apparatus connection processing can be attained by using a UPnP device proxy apparatus registration server 2001 connected to the network 100, as shown in FIG. 17.

<Module Arrangement and Function of UPnP Device Proxy Device Registration Server>

Figure 18:
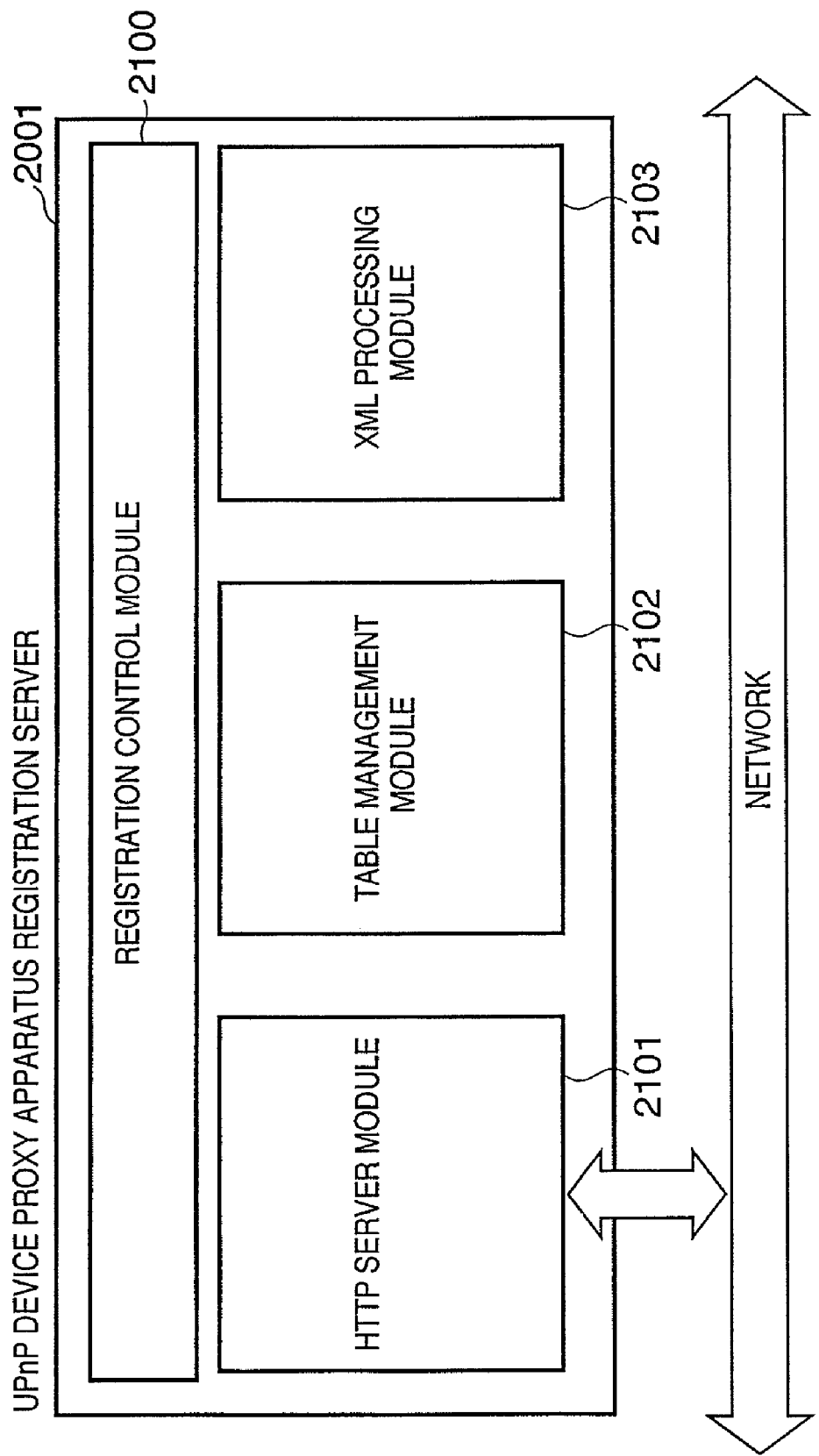
FIG. 18 is a block diagram showing the arrangement of an UPnP device proxy apparatus server module.

FIG. 18 is a block diagram showing the module arrangement of the UPnP device proxy apparatus registration server 2001 exemplifying one embodiment of the present invention.

The UPnP device proxy apparatus registration server 2001, which registers and manages the UPnP device proxy apparatuses and provides their information, comprises a registration control module 2100, HTTP server module 2101, table management module 2102, and XML processing module 2103.

The registration control module 2100 controls the HTTP server module 2101, table management module 2102, and XML processing module 2103, and exchanges data with interfaces of respective modules.

The HTTP server module 2101 has the same function as that of the HTTP server module 602.

The table management module 2102 has an UPnP proxy management table 2200 (to be described later) used to manage information regarding the UPnP device proxy apparatuses, and has a function of making search, addition, change, and deletion of data with respect to that table.

The XML processing module 2103 has the same function as that of the XML processing module 403.

<UPnP Proxy Management Table>

FIG. 19 is a conceptual view of the UPnP proxy management table 2200 held by the table management module 2102 exemplifying one embodiment of the present invention.

The UPnP proxy management table 2200 includes a Host-Name Item 2201, IpAddress item 2202, Place item 2203, and Comment item 2204. The UPnP proxy management table 2200 allows to make search, read/write, addition, and deletion of the respective items.

The HostName item 2201 stores the host name of the UPnP device proxy apparatus. The IPAddress item 2202 stores the IP address of the UPnP device proxy apparatus. The Place item 2203 stores information regarding the installation place or the like of the UPnP device proxy apparatus. The Comment item 2204 stores arbitrary information or the like of the UPnP device proxy apparatus.

<UPnP Device Proxy Registration>

The procedure of the processing for registering the UPnP device proxy apparatus 101 will be described below.

Upon double-clicking an icon indicating the UPnP device proxy apparatus 101 in a "My Network" folder of Explorer (available from Microsoft Corporation), a browser such as Internet Explorer (available from Microsoft Corporation) is launched, and a page shown in FIG. 20 is displayed.

The user of the user PC 102 inputs appropriate information in text input areas of "place" and "comment" of "proxy registration", and presses a registration button. Simultaneously with pressing of the registration button by the user of the user PC 102, the user PC 102 transmits a message, and the HTTP server module 802 of the UPnP device proxy apparatus 101 receives that message.

The main control module 801 acquires the place and comment input by the user from the message, acquires the host name and IP address of the self device, and creates a SOAP message shown in FIG. 21 using an operation name "registration", and the place, comment, host name, and IP address as its arguments. The main control module 801 then transmits the SOAP message to the UPnP device proxy apparatus registration server 2001 via the HTTP client module 803.

The HTTP server module 2101 receives the SOAP message, and processes it using the XML processing module 2103. The registration control module 2100 acquires the host name and IP address of the UPnP device proxy apparatus 101 and the Place value and Comment value input by the user as the processing result of the SOAP message. The registration control module 2100 passes the acquired value to the table management module 2102, which inserts these values in the UPnP proxy management table 2200. After the insertion, the registration control module 2100 transmits a SOAP response to the UPnP device proxy apparatus 101.

Upon reception of the SOAP response, the HTTP client module 803 of the UPnP device proxy apparatus 101 passes the SOAP response message to the main control module 801, which processes the message using the XML processing module 804. The main control module 801 displays a page that advises accordingly on the browser of the user PC based on the processing result.

<Connection Using UPnP Device Proxy Device Registration Servers

The procedure of connection processing using the UPnP device proxy apparatus registration server will be described below.

Upon double-clicking the icon indicating the UPnP device proxy apparatus 101 in the "My Network" folder of Explorer (available from Microsoft Corporation) on the user PC 102, the browser such as Internet Explorer (available from Microsoft Corporation) is launched, and the page shown in FIG. 20 is displayed.

That is, when the user of the user PC 102 double-clicks the icon indicating the UPnP device proxy apparatus 101 to establish connection to the UPnP device proxy apparatus 101, the UPnP device proxy apparatus 101 acquires registered information (including the host name or IP address as the information regarding the UPnP device proxy apparatus 101) from the UPnP device proxy apparatus registration server 2001. The user PC 102 displays the page shown in FIG. 20 by reflecting the information acquired by the UPnP device proxy apparatus 101.

The user of the user PC 102 selects the host name to be connected (the host name of the UPnP device proxy apparatus 101) from a list of "connection destination list", confirms the place and comment fields, and presses a connection button.

Note that the UPnP device proxy apparatus 103 side also executes processing for registering the UPnP device proxy apparatus 103 in the UPnP device proxy apparatus registration server 2001. FIG. 20 shows that "place" of "proxy registration" is "Tokyo office 1", and "printer is available" as "comment".

After that, the same processing (processing after transmission of the connection request message to the UPnP device proxy apparatus 101) as that after the IP address or host name of the UPnP device proxy apparatus 103 is input to the text input area of the browser and the connection button of the browser pressed in <UPnP Device Proxy Device Connection Processing> of embodiment 1 is executed.

Other Embodiments

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

The present invention is not limited to the above embodiments and various changes and modifications can be made within the spirit and scope of the present invention. Therefore to apprise the public of the scope of the present invention, the following claims are made.

CLAIM OF PRIORITY

This application claims priority from Japanese Patent Application No. 2004-126845, filed Apr. 22, 2004, which is hereby incorporated by reference herein in its entirety.

The invention claimed is:

1. A notification method, wherein a first connection apparatus is connected to a first network and a second network, and a second connection apparatus is connected to the second network and a third network, for notifying an apparatus connected to the third network of information regarding a device connected to the first network, said method comprising:

the first connection apparatus receiving a message which is broadcast periodically by the device connected to the first network, obtaining information regarding the device based on predetermined information included in the broadcast message, and transmitting a message including the information regarding the device to the second connection apparatus via the second network in a case where the information regarding the device is not stored in a table in the first connection apparatus for storing information regarding devices, wherein the predetermined information is storage location information of a storage location of the information regarding the device, and the information regarding the device is obtained from the storage location based on the storage location information;

the second connection apparatus receiving the message transmitted from the first connection apparatus via the second network, and transmitting, based on the message received from the first connection apparatus, a message indicating that the device is available onto the third network;

the first connection apparatus transmitting a predetermined message to the second connection apparatus via the second network in a case where the message broadcast by the device indicates that the device is unavailable; and the second connection apparatus transmitting a message indicating that the device is unavailable to the third network in a case where the predetermined message is received from the first connection apparatus.

2. The method according to claim 1, wherein the second connection apparatus acquires information regarding the first connection apparatus from an apparatus connected to the second network, and establishes connection to the first connection apparatus based on the acquired information.

* * * * *